Nov. 26, 1935.  A. RODDE ET AL  2,022,432
PRINTING APPARATUS FOR TRANSFERRING BICHROME OR
TRICHROME PICTURES TO LENTICULATED FILMS
Original Filed May 26, 1933  2 Sheets-Sheet 1

Inventors,
A. Rodde,
A. H. Hérault,
V. Hudeley, and
J. Lagrave.

By William C. Linton.
Attorney.

Nov. 26, 1935. A. RODDE ET AL 2,022,432
PRINTING APPARATUS FOR TRANSFERRING BICHROME OR
TRICHROME PICTURES TO LENTICULATED FILMS
Original Filed May 26, 1933 2 Sheets-Sheet 2

Inventors,
A. Rodde,
A. H. Hérault,
V. Hudeley, and
J. Lagrave.

By William C. Linton
Attorney.

Patented Nov. 26, 1935

2,022,432

UNITED STATES PATENT OFFICE 2,022,432

PRINTING APPARATUS FOR TRANSFERRING BICHROME OR TRICHROME PICTURES TO LENTICULATED FILMS

Armand Rodde and Albert Henri Hérault, Paris, Victor Hudeley, Clichy, and Jean Lagrave, Paris, France Application May 26, 1933, Serial No. 673,092. Renewed May 16, 1935. In France May 26, 1932

8 Claims. (Cl. 88—24)

The present invention has for object a printing apparatus permitting the transfer of bichrome or trichrome pictures from smooth film having successively or simultaneously recorded groups of pictures to a lenticulated film with microscopic refringent or lens elements.

This printing apparatus is more particularly adapted for trichrome films in which the images are divided into successive groups corresponding to the three elementary colours.

In the said transfer printing apparatus, the feed or advance step-by-step movement of the picture of the negative and positive films takes place at the same speed but there must be three advance step movements of the negative picture to one advance step movement of the picture of the unexposed reticulated or lenticulated film. In other words each picture on the unexposed film will receive three impressions from a group of three images or pictures of the negative film.

The respective feeds or advance step movements of the two films can be obtained in various ways, by gear, by cams, by Maltese cross and so on.

Figure 1:
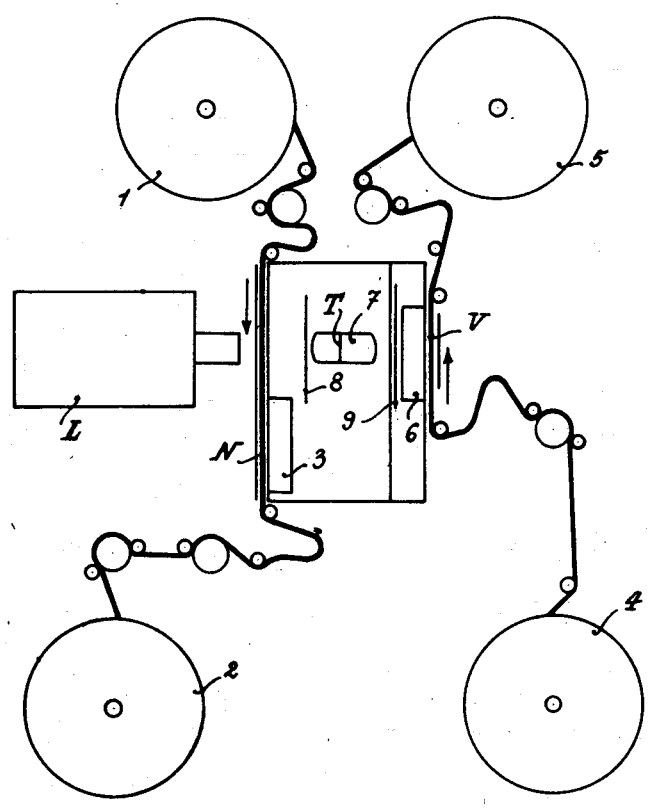
Figure 4:
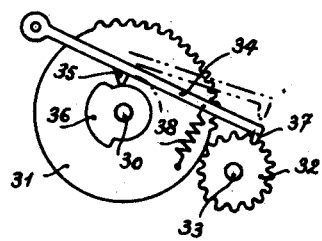
Figure 2:
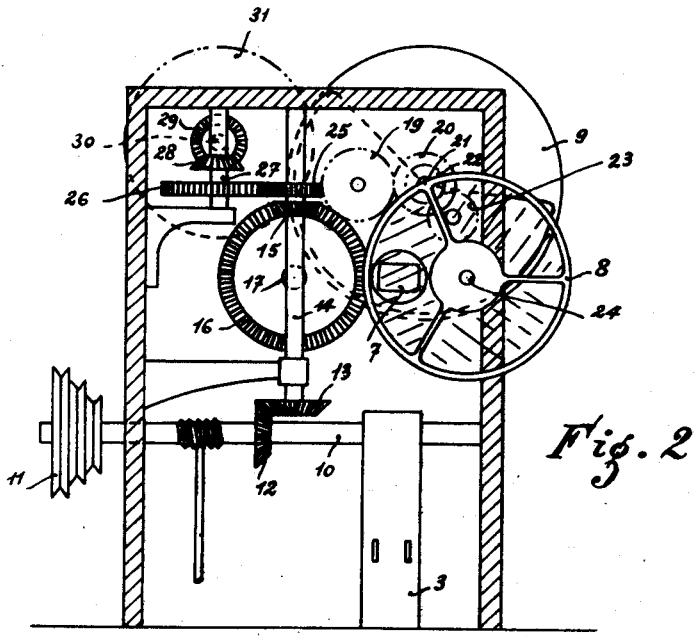
Figure 3:
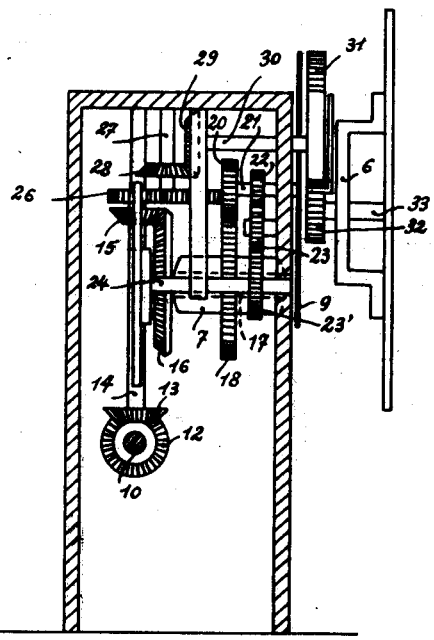

The invention will be better understood from the following description with reference to the accompanying drawings which show by way of example, in no way limitative, a form of construction of the apparatus and more particularly:

Fig. 1 a diagrammatic view of the complete printing apparatus;

Fig. 2 a rear view of the same;

Fig. 3 a side view of same, the side wall being removed;

Fig. 4 the locking device for the driving member for the unexposed film.

In the printing apparatus obtained according to the invention the smooth negative film N (Fig. 1) is delivered from a free loading reel 1 and wound on to a driven take-up reel 2. It passes through the passage of a feeding mechanism 3 having claws, a Maltese cross, or the like.

The unexposed lenticulated film V with refringent elements is delivered by a free loading reel 4 and wound onto a take-up reel 5. It likewise passes through the passage of the feeding mechanism 6 provided with claws, Maltese cross or the like, the drivng movement whereof is in reverse direction to that of the device 3.

Between the two films N and V is disposed an objectiv lens 7 projecting the images or pictures of the film N, illuminated by a lantern L, onto the film V.

A rotatable screen disc 8 and a shutter or diaphragm 9 rotate appropriately in relation to the objective or between the film N and said objective. In Fig. 1, the screen 8 is shown as mounted between the smooth trichrome film and the objective 7, and the diaphragm 9 is shown as mounted between the objective and the lenticulated film.

Now the film N comprising the trichrome groups of pictures corresponding to the elementary colours must be capable of allowing the projection of three pictures on a single picture of the film V, the two films having to be moved simultaneously after the exposure of the three pictures.

This result can be obtained by many devices, gear, Maltese cross, cams and so on.

In a gear driven arrangement for film feeding, given by way of simple example and in no way intended to limit the invention, a driving shaft 10 (Figs. 2, 3) receives its movement from a motor through the intermediary of pulleys 11 keyed on said shaft. This latter directly actuates the feed mechanism 3 for the film N and by means of two bevel wheels 12 and 13, a vertical shaft 14.

This shaft 14 drives, by means of a pinion wheel 15 and of a crown wheel 16, a shaft 17 on which is keyed a toothed wheel 18 engaging with another intermediate wheel 19.

Said wheel 19 engages with a wheel 20 keyed on the spindle 21 of the rotatable obturator or shutter 9.

A pinion wheel 22 keyed on spindle 21 meshes with a wheel 23 engaging with a toothed wheel 23' keyed on the shaft 24 of the rotatable screen carrier disc 8.

On the other hand the shaft 14 likewise drives, by means of two toothed wheels 25 and 26, a shaft 27 which, by means of two bevel wheels 28 and 29, gives rotation to another shaft 30.

On the shaft 30 is keyed a wheel 31 toothed for a part of its periphery and engaging intermittently with a wheel 32 keyed on shaft 33 which drives the feed mechanism 6 for the film V.

All these sets of gear wheels are so arranged as to permit the apparatus to function in the following manner:

If it be presumed that the film N is driven by means of drums rotating at a speed $v$, the shaft driving the feed mechanism 6 for the film V must likewise turn at a speed $v$ but in order that this displacement may take place only once for a displacement of three pictures of the film N the wheel 31 has teeth only over a third of its circumference and only gears with the pinion wheel 32 when its toothed part engages with the said pinion wheel.

On the other hand the shutter 9 must close the objective at each advance step movement of the picture of the smooth film N and is driven with the same speed $v$.

Finally the rotatable screen carrier disc 8, comprising three screens of the different primary colors, is rotated at a speed $$\frac{v}{3}$$

To permit an exact setting between the displacements of the lenticulated film V and the smooth film N, a locking device is provided on the feed or driving member for the film V in order to lock it during the advance step movement of two pictures of the film N and the exposure of the three pictures of a group of this film N. This result may be obtained in various manners. By way of a simple example the following means are given.

A lever 34 (Fig. 4) is pivotally mounted on the frame of the feed mechanism 6 for the film V. This lever carries a boss 35 capable of engaging with a cam 36 keyed on the shaft 30 of the wheel 31. At its extremity, said lever is provided with a finger 37 engaging between adjacent teeth of the pinion wheel 32 which rotates the shaft 33 which drives lenticulated film feed mechanism 6. The cam 36 is arranged and mounted in such a manner that it lifts the lever 34 at the moment when the toothed sector of the wheel 31 engages with the pinion wheel 32 and allows the said lever to fall again at the moment when the sector ceases to engage the pinion wheel 32. The finger 37 then becomes inserted in the teeth of this pinion wheel and locks it until the following turn of the wheel 31.

A spring 38 tends to pull the finger 37 constantly into contact with the wheel 32.

The printing takes place according to the ordinary method used for transfer by projection with the suitable objective 7 provided at its nodal point with a trichrome screen T adapted to effect the selection on the lenticular elements of the film V, of the pictures of the negative film N. The pictures can also be tinted as may be necessary. As shown, the trichrome screen T is substantially perpendicular to the optical axis of the objective system.

The interposition of selecting filters necessitates the use of a panchromatic film, nevertheless by eliminating these filters and by using a system of three diaphragms in front of or in the objective, the panchromatic film can be replaced by an ordinary film.

In the case where the film N to be reproduced is a bichrome film, the wheel 31 would be toothed over half its circumference and the rotatable screen carrier disc would have a speed of $$\frac{v}{2}$$

Two pictures of the film N will be advanced forward for a single picture of the film V.

It is clear that many different modifications can be given to the apparatus here above described without exceeding the scope of the invention. The driving means for the driving arrangements of the film could consist of other kinds of gear, cams, Maltese crosses and so on.

What we claim, is:

1. In an apparatus for reproducing, upon a lenticular film, selected and successively registered monochrome images of a trichrome film, means intermittently driving the trichrome film; means intermittently driving the lenticular film; an objective disposed between said means and adapted to project the images of the multichrome film upon the lenticular film, said driving means of the lenticular film operating only once while the driving means of the trichrome film operates three times whereby to cause the projection of the images of the trichrome film in a single image on the lenticular film; a shutter arranged between the lenticular film and said objective for intercepting the luminous rays during each movement of the trichrome film; and, a rotatable screen positioned between said trichrome film and objective and carrying three different filters, of substantially equal areas, said screen rotating three times slower than said shutter.

2. In an apparatus for reproducing upon a lenticular film, selected and successively registered monochrome images of a trichrome film, means intermittently feeding the trichrome film; means intermittently feeding the lenticular film; an objective disposed between said means and adapted to project the images of the trichrome film upon the lenticular film, said feeding means of the lenticular film operating only once while the feeding means of the trichrome film operates three times whereby to cause the projection of all the images of the trichrome film corresponding to a single view on to a single frame of the lenticular film; a rotatable screen positioned between said trichrome film and objective and provided with three colored filters each adapted to be brought before the corresponding monochrome image to be projected; and a trichrome filter in said objective, said last mentioned filter being placed at the nodal point of said objective for selecting the images projected upon the lenticular element of the film to be impressed.

3. In an apparatus for reproducing a lenticular film, selected and successively registered monochrome images of a multichrome film, means intermittently feeding the multichrome film; means intermittently feeding the lenticular film; an objective disposed between said means and adapted to project the images of the multichrome film upon the lenticular film, said feeding means of the lenticular film operating only once while the feeding means of the multichrome film operates for a number of times equal to the number of images corresponding to a single view upon the multichrome film whereby to cause a projection of all the images of the multichrome film on to a single image of the lenticular film; a screen positioned between said multichrome film and objective; a filter in said objective, and means associated with said feeding means of the lenticular film for positively locking said lenticular film during the exposing of the images of the multichrome group of the film to be reproduced upon the lenticular film.

4. In a transfer photographic projection printer for transferring the three images of a given trichrome group on smooth film on to each one of the frames of a lenticulated film, a loading reel and a take-up reel for said smooth film, a loading reel and a take-up reel for said lenticulated film, means for feeding said trichrome smooth film, means for feeding said lenticulated film, an actuating gear wheel provided with teeth over its entire periphery and mounted for actuating said means for feeding said lenticulated film, a mutilated gear wheel having teeth over only one-third of its periphery and mounted parallel to said first mentioned gear wheel for engagement of the teeth of said gear wheels, an objective, a rotatable shutter mounted between said objective and said lenticulated film, a main drive shaft mounted to synchronously drive said means for feeding said trichrome smooth film, a train of gear wheels mounted to drive said mutilated gear wheel from said main drive shaft synchronously therewith, and a train of gear wheels mounted to drive said rotatable shutter from said main drive shaft synchronously therewith, whereby said lenticulated film is fed at one-third the speed of said smooth film.

5. In a transfer photographic projection printer for transferring the three images of a given trichrome group on smooth film on to each one of the frames of a lenticulated film, a loading reel and a take-up reel for said smooth film, a loading reel and a take-up reel for said lenticulated film, means for feeding said trichrome smooth film, means for feeding said lenticulated film, an actuating gear wheel provided with teeth over its entire periphery and mounted for actuating said means for feeding said lenticulated film, a mutilated gear wheel having teeth over only one-third of its periphery and mounted parallel to said first mentioned actuating gear wheel for engagement of the teeth of said gear wheels, an objective, a rotatable shutter mounted between said objective and said lenticulated film, a rotatable screen carrier carrying three screens mounted between said objective and said smooth film, a main drive shaft mounted to synchronously drive said means for feeding said trichrome smooth film, a train of gear wheels mounted to drive said mutilated gear wheel from said main drive shaft synchronously therewith, a train of gear wheels mounted to drive said rotatable shutter from said main drive shaft synchronously therewith, and a train of gear wheels mounted to drive said rotatable screen carrier from said main drive shaft at one-third the speed thereof, whereby said lenticulated film is fed at one-third the speed of said smooth film.

6. In a transfer photographic projection printer for transferring the three images of a given trichrome group on smooth film on to each one of the frames of a lenticulated film, a loading reel and a take-up reel for said smooth film, a loading reel and a take-up reel for said lenticulated film, means for feeding said trichrome smooth film, means for feeding said lenticulated film, an actuating gear wheel provided with teeth over its entire periphery and mounted for actuating said means for feeding said lenticulated film, a mutilated gear wheel having teeth over only one-third of its periphery and mounted parallel to said first mentioned actuating gear wheel for engagement of the teeth of said gear wheels, an objective, a trichrome screen mounted in said objective, substantially at the nodal point thereof, a rotatable shutter mounted between said objective and said lenticulated film, a rotatable screen carrier carrying three screens mounted between said objective and said smooth film, a main drive shaft mounted to synchronously drive said means for feeding said trichrome smooth film, a train of gear wheels mounted to drive said mutilated gear wheel from said main drive shaft synchronously therewith, a train of gear wheels mounted to drive said rotatable shutter from said main drive shaft synchonously therewith, and a train of gear wheels mounted to drive said rotatable screen carrier from said main drive shaft at one-third the speed thereof, whereby said lenticulated film is fed at one-third the speed of said smooth film.

7. In a transfer photographic projection printer for transferring the three images of a given trichrome group on smooth film on to each one of the frames of a lenticulated film, a loading reel and a take-up reel for said smooth film, a loading reel and a take-up reel for said lenticulated film, means for feeding said trichrome smooth film, means for feeding said lenticulated film, an actuating gear wheel provided with teeth over its entire periphery and mounted for actuating said means for feeding said lenticulated film, a mutilated gear wheel having teeth over only one-third of its periphery and mounted parallel to said first mentioned gear wheel for engagement of the teeth of said gear wheels, an objective, a rotatable shutter mounted between said objective and said lenticulated film, a main drive shaft mounted to synchronously drive said means for feeding said trichrome smooth film, a train of gear wheels mounted to drive said mutilated gear wheel from said main drive shaft synchronously therewith, a train of gear wheels mounted to drive said rotatable shutter from said main drive shaft synchronously therewith, and a locking mechanism for positively locking said means for feeding said lenticulated film during the interval between the advance of the first of each group of three frames on said smooth film and during the exposure of said frames on said smooth film, said locking mechanism comprising a cam rotatable coaxially and cooperatively with said mutilated gear wheel, a pawl actuatable by said cam and engageable in said gear wheel for actuating said means for feeding said lenticulated film, said cam being adapted to cause said pawl to engage said actuating gear wheel at all times when the teeth on said mutilated gear wheel do not engage said actuating gear wheel, whereby said lenticulated film is fed at one-third the speed of said smooth film.

8. In a transfer photographic projection printer for transferring the three images of a given trichrome group on smooth film on to each one of the frames of a lenticulated film, a loading reel and a take-up reel for said smooth film, a loading reel and a take-up reel for said lenticulated film, means for feeding said trichrome smooth film, means for feeding said lenticulated film, an actuating gear wheel provided with teeth over its entire periphery and mounted for actuating said means for feeding said lenticulated film, a mutilated gear wheel having teeth over only one-third of its periphery and mounted parallel to said first mentioned actuating gear wheel for engagement of the teeth of said gear wheels, an objective, a trichrome screen mounted in said objective substantially at the nodal point thereof, a rotatable shutter mounted between said objective and said lenticulated film, a rotatable screen carrier carrying three screens mounted between said objective and said smooth film, a main drive shaft mounted to synchronously drive said means for feeding said trichrome smooth film, a train of gear wheels mounted to drive said mutilated gear wheel from said main drive shaft synchronously therewith, a train of gear wheels mounted to drive said rotatable shutter from said main drive shaft synchronously therewith, a train of gear wheels mounted to drive said rotatable screen carrier from said main drive shaft at one-third the speed thereof, and a locking mechanism for positively locking said means for feeding said lenticulated film during the interval between the advance of the first of each group of three frames on said smooth film and during the exposure of said frames on said smooth film, said locking mechanism comprising a cam rotatable coaxially and cooperatively with said mutilated gear wheel, a pawl actuatable by said cam and engageable in said gear wheel for actuating said means for feeding said lenticulated film, said cam being adapted to cause said pawl to engage said actuating gear wheel at all times when the teeth on said mutilated gear wheel do not engage said actuating gear wheel, whereby said lenticulated film is fed at one-third the speed of said smooth film.

ARMAND RODDE.
ALBERT HENRI HÉRAULT.
VICTOR HUDELEY.
JEAN LAGRAVE.